United States Patent
Shimada

(10) Patent No.: US 6,831,922 B1
(45) Date of Patent: Dec. 14, 2004

(54) CONTENTION PRIORITY CONTROL CIRCUIT

(75) Inventor: Koushin Shimada, Fukuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/565,445

(22) Filed: May 5, 2000

(30) Foreign Application Priority Data

May 12, 1999 (JP) .......................................... 11/130975

(51) Int. Cl.[7] ........................ H04L 12/28; H04L 12/403
(52) U.S. Cl. ...................................... 370/403; 370/455
(58) Field of Search .............................. 370/230, 235, 370/395.1, 395.21, 395.62, 395.43, 412–418, 451, 452, 462, 461, 447, 402, 403, 404, 455, 460

(56) References Cited

U.S. PATENT DOCUMENTS

| | | | |
|---|---|---|---|
| 5,640,519 A * | 6/1997 | Langendorf et al. | 710/111 |
| 5,796,732 A * | 8/1998 | Mazzola et al. | 370/462 |
| 5,931,931 A * | 8/1999 | Nguyen | 710/113 |
| 5,953,341 A * | 9/1999 | Yamanaka et al. | 370/416 |
| 6,046,982 A * | 4/2000 | Ozveren et al. | 370/412 |
| 6,052,375 A * | 4/2000 | Bass et al. | 370/412 |
| 6,067,301 A * | 5/2000 | Aatresh | 370/418 |
| 6,104,714 A * | 8/2000 | Baudelot et al. | 370/396 |
| 6,205,150 B1 * | 3/2001 | Ruszczyk | 370/412 |
| 6,269,079 B1 * | 7/2001 | Marin et al. | 370/230 |
| 6,292,491 B1 * | 9/2001 | Sharper | 370/412 |
| 6,496,516 B1 * | 12/2002 | Dabecki et al. | 370/460 |
| 6,678,282 B2 * | 1/2004 | Sharper et al. | 370/442 |

FOREIGN PATENT DOCUMENTS

| | | |
|---|---|---|
| JP | 04-316241 | 11/1992 |
| JP | 04-360340 | 12/1992 |
| JP | 6-338905 | 12/1994 |
| JP | 8-194659 | 7/1996 |
| JP | 09-149051 | 6/1997 |
| JP | 10-190693 | 7/1998 |
| JP | 10-222462 | 8/1998 |
| JP | 2833796 | 10/1998 |
| JP | 11-068770 | 3/1999 |

OTHER PUBLICATIONS

Japanese Office Action dated Apr. 1, 2003, with English translation of pertinent portions.

* cited by examiner

*Primary Examiner*—Andy Lee
(74) *Attorney, Agent, or Firm*—Whithman, Curtis, & Christofferson P.C.

(57) ABSTRACT

A contention priority control circuit which receives data of two priority classes from a plurality of input ports, and arbitrates contention between output requests for outputting these data to a bus on the basis of the priority classes and priorities determined for the respective input ports includes a plurality of arbiters which are arranged at a plurality of input ports for receiving data of the two priority classes, and receive data output requests for each of the two priority classes, a forward high-priority ring for connecting the plurality of arbiters in a forward direction, a forward low-priority ring for connecting the plurality of arbiters in the forward direction, and a backward high-priority ring for connecting the plurality of arbiters in a backward direction opposite to the forward direction.

12 Claims, 7 Drawing Sheets

CONTENTION PRIORITY CONTROL CIRCUIT

BACKGROUND OF THE INVENTION

1. Field of the Invention

The present invention relates to a contention priority control circuit, particularly, to a ring arbiter with two priority classes and, more particularly, to a contention priority control circuit applied, e.g., to realize an output cell select function in an ATM (Asynchronous Transfer Mode) switching.

2. Description of the Prior Art

General ATM switching architectures include an output buffer type architecture, shared buffer type architecture, input buffer type architecture, and cross-point type architecture.

For example, an output buffer type switch is advantageous because of high throughput and simple control. This output buffer type switch, however, multiplexes and buffers input ATM cells. This operation decreases the processing speed, and the input/output link speed is difficult to increase.

In recent years, high-speed, large-scale switches are being realized along with an abrupt increase in traffic for the Internet and an increase in ATM network speed using an optical fiber and like.

To follow this trend, the output buffer type switch realizes a large-scale switch by, e.g., connecting switches of the ATM switching serving as cores in a square matrix. This connection requires a function of copying an input cell with respect to horizontal core switches, and a function of selecting an output cell with respect to vertical core switches. A ring arbiter is applied to realize this output select function in the ATM switching.

In a recent ATM switching, a plurality of priority classes must be set in cell buffers to process cells within the switch based on the priority classes in order to ensure QOS (Quality Of Service). Further, switches must be multistage-connected to increase the switch scale.

However, a conventional ring arbiter returns only one output permission for output requests that are not discriminated by priority classes between ports.

No prior art realizes a ring arbiter which is constituted by multistage-connecting switches and arbitrates cell output contention between output ports when the ring arbiter has cell buffers for, e.g., two priority classes.

SUMMARY OF THE INVENTION

The present invention has been made to overcome the conventional drawbacks, and has as its object to provide a ring arbiter which is constituted by multistage-connecting switches, and arbitrates cell output contention between output ports when the ring arbiter has cell buffers for, e.g., two priority classes.

To achieve the above object, according to the first aspect of the present invention, there is provided a contention priority control circuit which receives data of two priority classes from a plurality of input ports, and arbitrates contention between output requests for outputting the plurality of data to a bus on the basis of the priority classes and priorities determined for the respective input ports.

According to the second aspect of the present invention, there is provided a circuit capable of arbitrating output requests between ports when a plurality of ports having data to be output onto a bus simultaneously exist on the bus connected to n (at least two) ports, and arbitrating contention of data output requests between ports and between priority classes when a contention priority control circuit for determining a port for outputting data to the bus receives high- and low-priority class data output requests at respective ports.

According to the third aspect of the present invention, there is provided an ATM switchboard comprising the contention priority control circuit defined in the first or second aspect.

As is apparent from the above aspects, the present invention can arbitrate contention between ports and between two priority classes.

A conventional ring arbiter must search on a high-priority class side on a ring-like control line in the first cycle and search on a low-priority class side in the second cycle. To the contrary, the present invention adopts a forward high-priority ring, forward low-priority ring, and backward high-priority ring. Search is done on respective ring control lines in parallel with each other, thereby reducing the processing time to one cycle at maximum. The processing time can be shortened.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

A preferred embodiment of the present invention will be described below with reference to the accompanying drawings.

Figure 1:
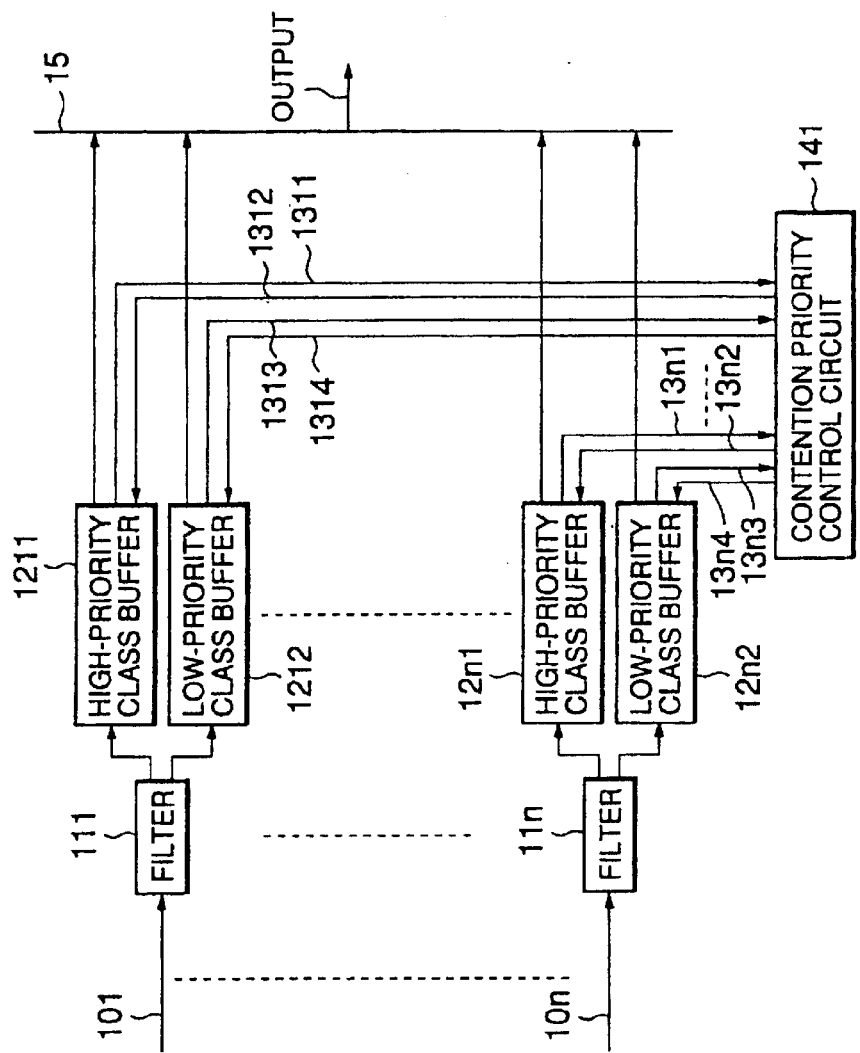
FIG. 1 is a block diagram showing an arrangement which uses a contention priority control circuit having a ring arbiter according to the present invention.

FIG. 1 is a block diagram showing an arrangement which uses a contention priority control circuit with a ring arbiter according to the present invention.

Reference numerals 101 to 10n denote input ports for receiving data output from preceding devices to a bus. This embodiment uses n input ports.

Data input to the input ports 101 to 10n have flags each representing the priority of the data. Depending on this information, filters 111 to 11n determine whether the input data are to be transmitted to high-priority class buffers 1211 to 12n1 or low-priority class buffers 1212 to 12n2.

The high-priority class buffers 1211 to 12n1 and low-priority class buffers 1212 to 12n2 temporarily store data during output arbitration between ports and between priority classes by a contention priority control circuit (ring arbiter) 141. The output arbitration period will be referred to as a "cell period".

When the high-priority class buffers 1211 to 12n1 store data, they transmit high-priority class output requests 1311 to 13n1 to the contention priority control circuit 141. When the high-priority class buffers 1211 to 12n1 receive high-priority class output permissions 1312 to 13n2 from the contention priority control circuit 141, they output data to a bus 15.

Similarly, when the low-priority class buffers 1212 to 12n2 store data, they transmit low-priority class output requests 1313 to 13n3 to the contention priority control circuit 141. When the low-priority class buffers 1212 to 12n2 receive low-priority class output permissions 1314 to 13n4 from the contention priority control circuit 141, they output data to the bus 15.

Figure 2:
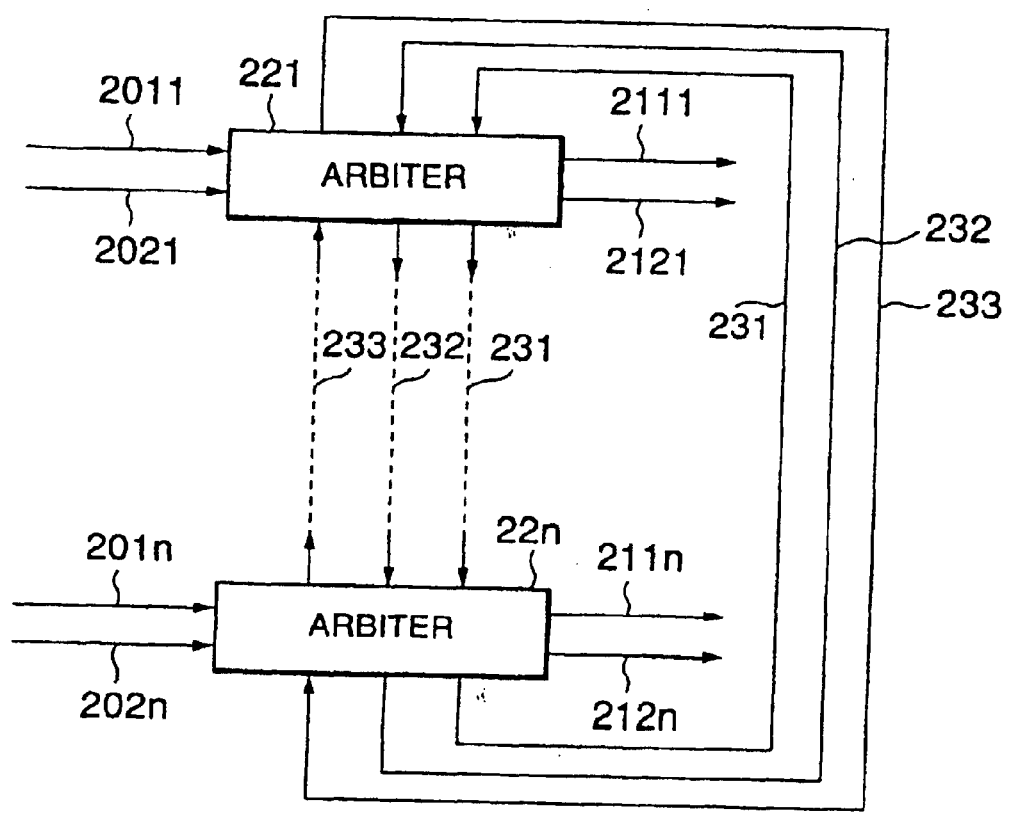
FIG. 2 is a block diagram showing the internal arrangement of the contention priority control circuit shown in FIG. 1.

FIG. 2 is a block diagram showing the internal arrangement of the contention priority control circuit (ring arbiter) 141 shown in FIG. 1.

N arbiters 221 to 22n are arranged at respective input ports, and receive high-priority class output requests 2011 to 201n or low-priority class output requests 2021 to 202n. In this case, if high-priority class output requests exist, the arbiters 221 to 22n select one port from the high-priority class output requests under rotational priority control. If no high-priority class output requests exist but low-priority class output requests exist, the arbiters 221 to 22n select one port from the low-priority class output requests under rotational priority control.

The selected port is informed to the high- or low-priority class buffers by high-priority class output permissions 2111 to 211n or low-priority class output permissions 2121 to 212n.

A forward high-priority ring 231 which cascade-connects the arbiters 221 to 22n searches for a high-priority class output request in a forward direction from 2011 to 201n. High-priority class output requests subsequent to the high-priority class output request found first are masked.

Similarly, a forward low-priority ring 232 searches for a low-priority class output request in a forward direction from 2021 to 202n. Low-priority class output requests subsequent to the low-priority class output request found first are masked.

A backward high-priority ring 233 searches for a high-priority class output request in a backward direction from 201n to 2011. The backward high-priority ring 233 is used to mask low-priority class output requests on the backward side when high-priority class output requests exist on the forward side from low-priority class output requests.

Figure 3:
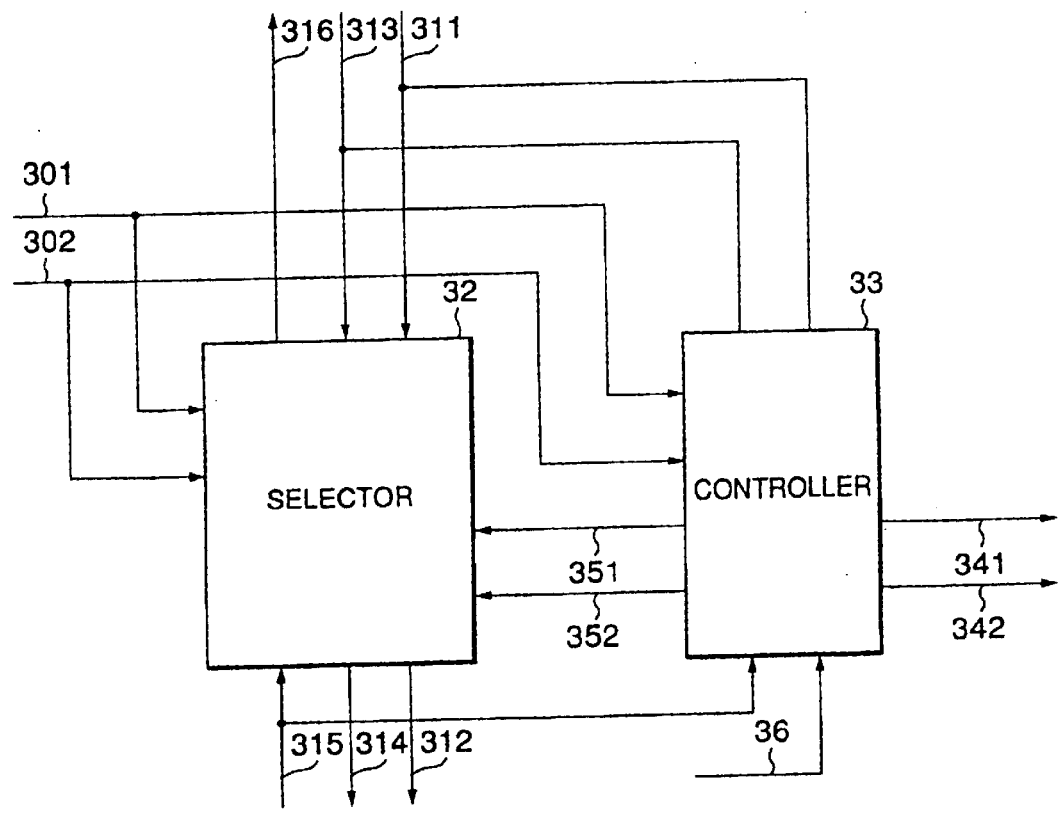
FIG. 3 is a block diagram showing the internal arrangement of the arbiter shown in FIG. 2.

FIG. 3 is a block diagram showing the internal arrangement of the arbiter shown in FIG. 2.

In FIG. 3, reference numeral 301 denotes a high-priority class output request; 302, a low-priority class output request; 311, a forward high-priority ring input; 312, a forward high-priority ring output; 313, a forward low-priority ring input; 314, a forward low-priority ring output; 315, a backward high-priority ring input; 316, a backward high-priority ring output; 32, a selector in the arbiter; 33, a controller in the arbiter; 341, a high-priority class output permission; 342, a low-priority class output permission; 351, an internal control signal of the arbiter (to be referred to as a "high-priority ring state value" hereinafter) for determining a high-priority class output permission; 352, an internal control signal of the arbiter (to be referred to as a "low-priority ring state value" hereinafter) for determining a low-priority class output permission; and 36, a timing signal which determines an arbitration processing time and has the same time interval as the cell period.

As an initial condition, the high- and low-priority ring state values 351 and 352 must be logic "1" in only one of n (at least two) arbiters. The remaining arbiters are at logic "0". After that, the high-priority ring state value 351 is logic "1" in only one arbiter given a high-priority class output permission among the n arbiters. The low-priority ring state value 352 is logic "1" in only one arbiter given a low-priority class output permission among the n arbiters. These signals are used to determine the priorities of ports for each priority class.

An arbiter given an output permission in the cell period acquires the lowest priority in selecting an output request in the next cell period, and an arbiter subsequent to this arbiter in the forward direction acquires the highest priority. The priority descends in the ring order.

Figure 4:
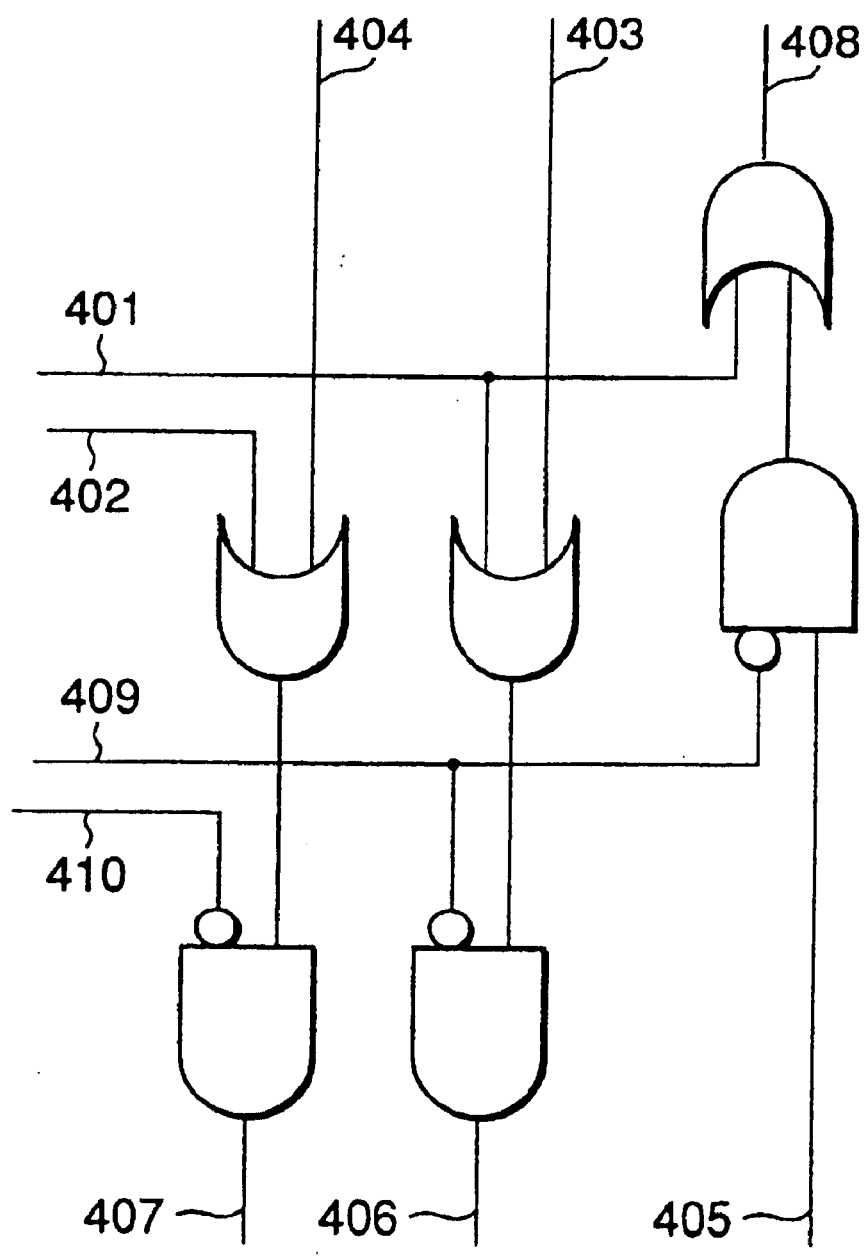
FIG. 4 is a circuit diagram showing a selector of the arbiter shown in FIG. 3.

FIG. 4 is a circuit diagram showing an example of the selector 32 of the arbiter shown in FIG. 3.

In FIG. 4, reference numeral 401 denotes a high-priority class output request; 402, a low-priority class output request; 403, a forward high-priority ring input; 404, a forward low-priority ring input; 405, a backward high-priority ring input; 406, a forward high-priority ring output; 407, a forward low-priority ring output; 408, a backward high-priority ring output; 409, a high-priority ring state value; and 410, a low-priority ring state value.

Figure 5:
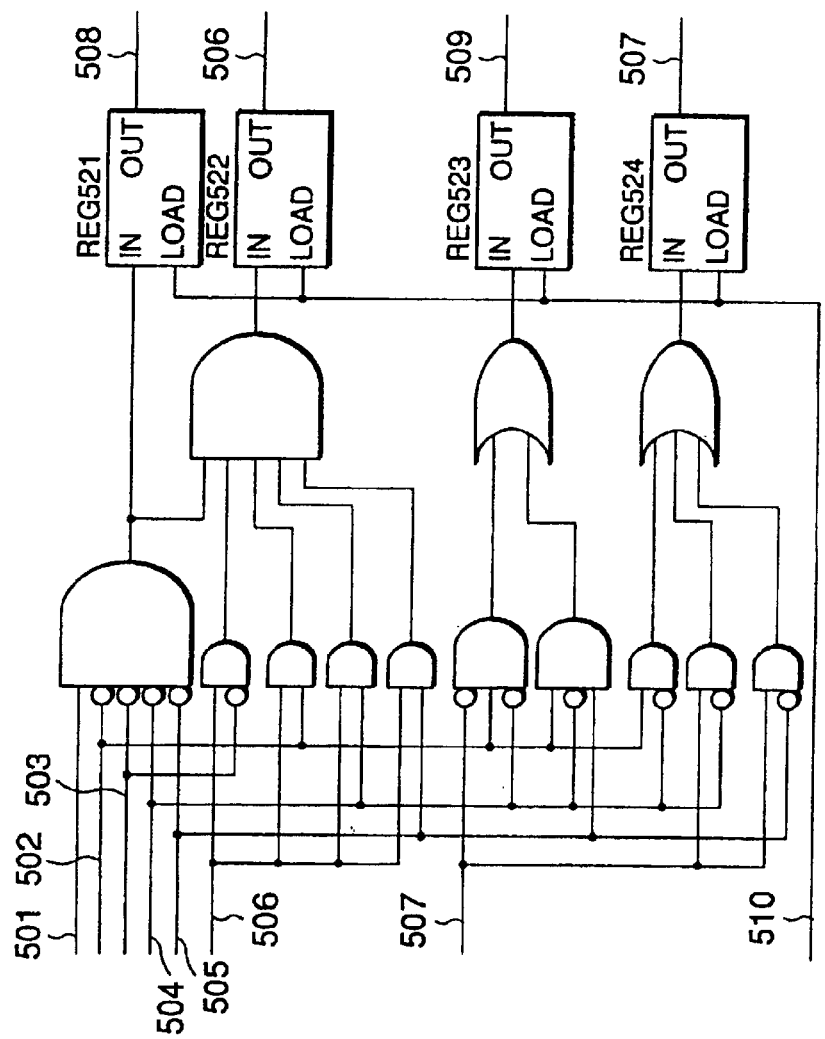
FIG. 5 is a circuit diagram showing a controller of the arbiter shown in FIG. 3.

FIG. 5 is a circuit diagram showing an example of the controller 33 of the arbiter shown in FIG. 3.

In FIG. 5, reference numeral 501 denotes a low-priority class output request; 502, a high-priority class output request; 503, a forward low-priority ring input; 504, a forward high-priority ring input; 505, a backward high-priority ring input; 506, a low-priority ring state value; 507, a high-priority ring state value; 508, a low-priority class output permission; 509, a high-priority class output permission; and 510, a timing signal for outputting the high- and low-priority class output permissions 509 and 508 as arbitration results from the contention priority control circuit. The timing signal 510 is a signal for latching the high- and low-priority ring state values 507 and 506 inside the arbiter by registers (REG) 521, 522, 523, and 524 once at one cell period.

The above circuit and control method can arbitrate contention between ports and between two priority classes. If a conventional ring arbiter assumes to arbitrate contention between ports and between two priority classes, the ring arbiter must search on a high-priority side on a ring-like control line in the first cycle and search on a low-priority side in the second cycle. To the contrary, this embodiment adopts the forward high-priority class ring, forward low-priority class ring, and backward high-priority class ring. The search time can be reduced to one cycle at maximum. The present invention can shorten the processing time by this parallel processing.

In the above-described embodiment, the number of input ports is n. In the following example, the number of input ports is four.

Figure 6:
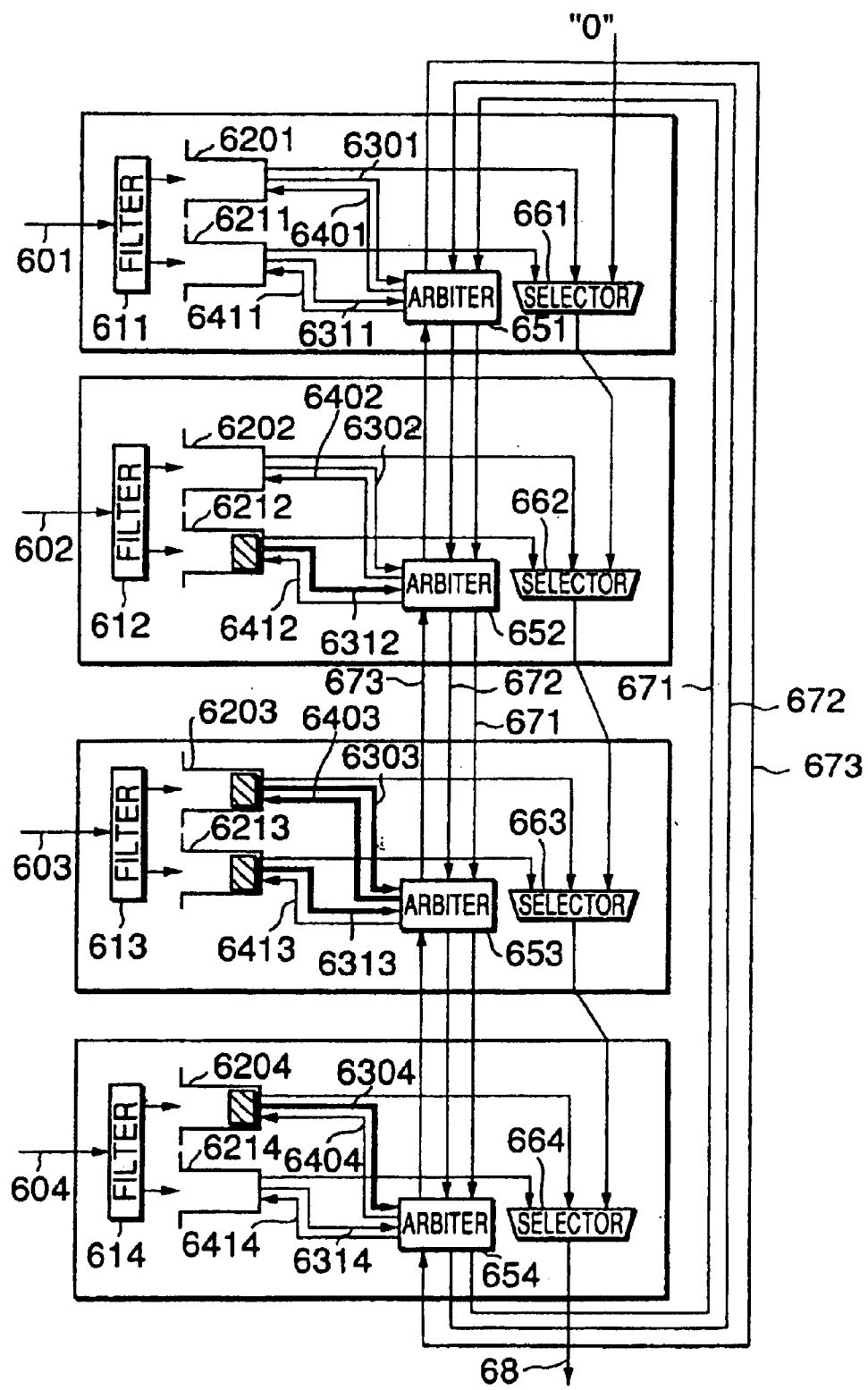
FIG. 6 is a block diagram showing a case in which the output cell select function section of an output buffer type switch according to the present invention has four input ports.

FIG. 6 is a block diagram showing a case in which the output cell select function section of an output buffer type switch according to the present invention uses four input ports.

This example concerns the output cell select function of an output buffer type switch expanded to a 4×4 square matrix.

Cell data input from preceding devices inside the switch to input ports 601 to 604 are stored in high-priority class cell buffers 6201 to 6204 or low-priority class cell buffers 6211 to 6214 by filters 611 to 614 depending on QOS (Quality Of Service).

When the high-priority class cell buffers 6201 to 6204 store cell data, they transmit high-priority class output requests 6301 to 6304 to arbiters 651 and 654 at the ports.

When the high-priority class cell buffers 6201 to 6204 receive high-priority class output permissions 6401 to 6404 from the arbiters 651 to 654, they output cell data to selectors 661 to 664.

When the low-priority class cell buffers 6211 to 6214 store cell data, they transmit low-priority class output requests 6311 to 6314 to the arbiters 651 to 654 at the ports.

When the low-priority class cell buffers 6211 to 6214 receive low-priority class output permissions 6411 to 6414 from the arbiters 651 to 654, they output cell data to the selectors 661 to 664.

An output cell from the switch connected in a 4×4 square matrix is one from the selectors 661 to 664, and is one cell data selected by the arbiters 651 to 654 during the cell period.

The operation of this embodiment will be described.

Figure 7:
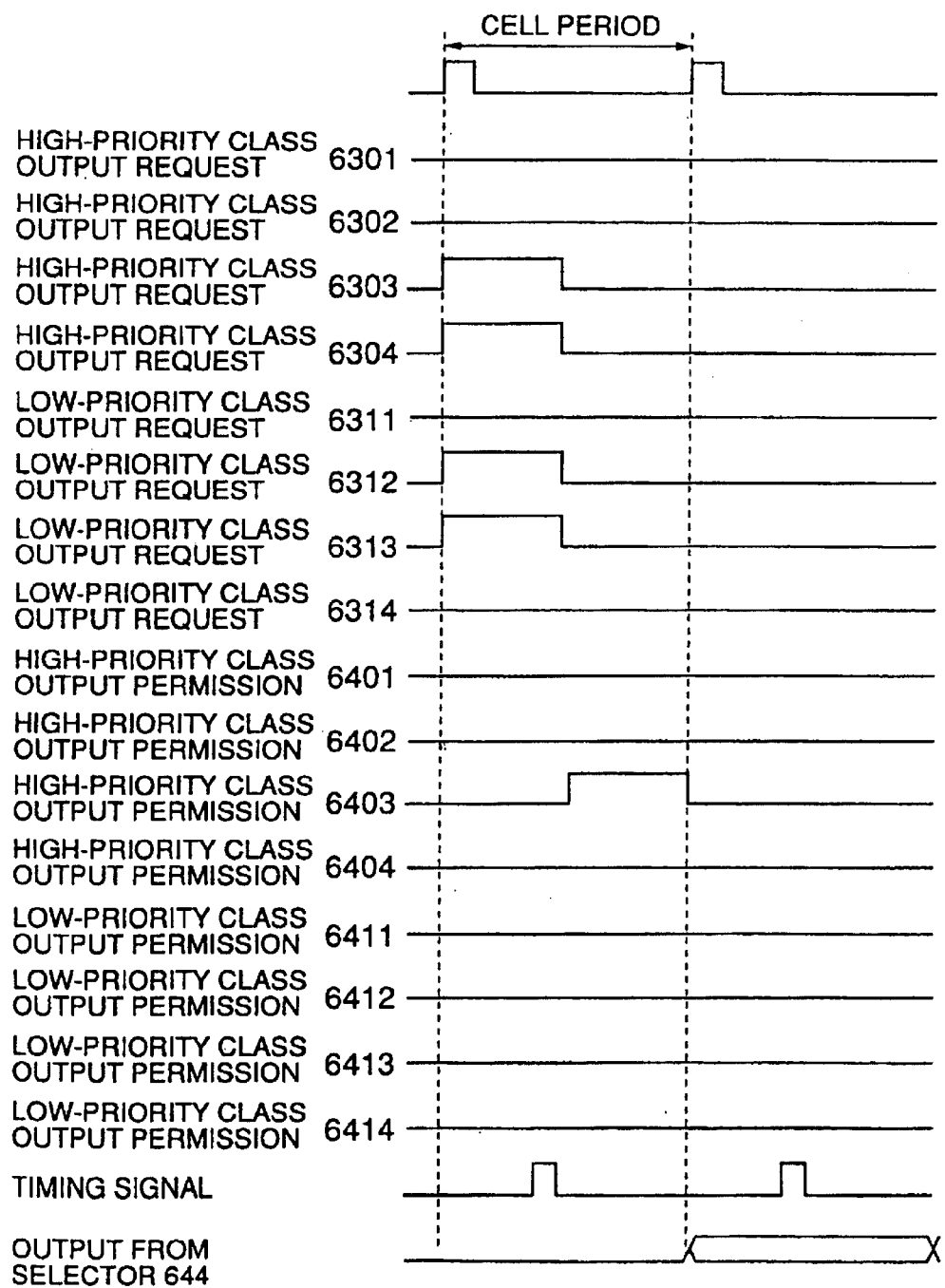
FIG. 7 is a timing chart showing the operation of the example shown in FIG. 6.

FIG. 7 is a timing chart showing the operation of an output cell select function of the output buffer type switch shown in FIG. 6.

The operation of the output cell select function in FIG. 6 will be described with reference to the timing chart of FIG. 7.

As an initial condition, the high- and low-priority ring state values serving as control signals inside the arbiters 651 to 654 exhibit the initial value "1" only in the arbiter 654. The arbiters 651 to 653 are at the initial value "0". That is, the arbiter 651 has the highest priority, and the priority descends in an order of the arbiters 652, 653, and 654. The arbiter priority is determined by, e.g., round robin scheduling for each of two priority classes.

FIG. 7 shows that the arbiter 652 receives the low-priority class output request 6312 during the first cell period; the arbiter 653, the high- and low-priority class output requests 6303 and 6313; and the arbiter 654, the high-priority class output request 6304. These output requests are represented by bold lines in FIG. 6.

The arbiters 651 to 654 simultaneously execute the following processing.

Processing (1): detection of a high-priority class output request having the highest priority on the forward high-priority ring, and masking of subsequent high-priority output permissions Processing (2): detection of a low-priority class output request having the highest priority on the forward low-priority ring, and masking of subsequent low-priority output permissions Processing (3): detection of a high-priority class output request on the backward high-priority ring Processing (1) will be explained. In selecting a high-priority class output request, the arbiter 653 recognizes from a forward high-priority ring 671 that no high-priority class output requests exist in the arbiters 651 and 652 having higher priorities than the priority at the port of the arbiter 653. The high-priority class output request 6303 to the arbiter 653 is regarded as an output request having the highest priority among high-priority class output requests. The arbiter 653 transmits the detection result to the subsequent arbiter 654 through the forward high-priority ring 671.

The arbiter 654 recognizes that the high-priority class output request exists on the higher-priority side of the arbiters 651 to 653, and masks a high-priority class output permission at its own port.

Processing (2) will be explained. In selecting a low-priority class output request, the arbiter 652 recognizes from a forward low-priority ring 672 that no low-priority class output request exists in the arbiter 651 having a higher priority than the priority at the port of the arbiter 652. The low-priority class output request 6312 to the arbiter 652 is regarded as an output request having the highest priority among low-priority class output requests. The arbiter 652 transmits the detection result to the subsequent arbiters 653 and 654 through the forward low-priority ring 672.

The arbiter 653 recognizes that the low-priority class output request exists on the higher-priority side of the arbiters 651 and 652, and masks a low-priority class output permission at its own port.

Processing (3) will be explained. The arbiter 654 sequentially transmits the detection of the high-priority class output request 6304 to the subsequent arbiters 653, 652, and 651 by writing the high-priority class output request 6304 on the backward high-priority ring 673.

The arbiter 653 also sequentially transmits the presence of the high-priority class output request 6303 at its own port to the subsequent arbiters 652 and 651 by rewriting the high-priority class output request 6303 on the backward high-priority ring 673.

Processing of determining only one output permission from output requests will be explained.

In the arbiter 651, neither high-priority class output request nor low-priority class output request exists, so no output permission is given.

In the arbiter 652, the low-priority class output request 6312 exists at its own port, but a high-priority class output request exists on the side of the arbiters 653 and 654 from the backward high-priority ring 673. Thus, the low-priority class output request 6312 is not given any output permission.

In the arbiter 653, the low-priority class output request 6313 is not given any output permission in processing (2). As for the high-priority class output request 6303, the high-priority class output request 6304 exists in the arbiter 654 on the backward high-priority ring, but the arbiter 653 has a higher priority than that of the arbiter 654. Thus, only the high-priority class output request 6303 is given the output permission 6403.

In the arbiter 654, the high-priority class output request 6304 exists but is not given any output permission in processing (1).

Accordingly, the four arbiters 651 to 654 arranged vertically return only the high-priority class output permission 6403.

Of the high-priority class cell buffers 6201 to 6204 and low-priority class cell buffers 6211 to 6214, only the high-priority class cell buffer 6203 which received the high-priority class output permission 6403 outputs cell data to the selector 663.

Of the selectors 661 to 664, only the selector 663 selects an input from its own port. The remaining selectors 661, 662, and 664 select and output cell data from the upstream.

The final output of cell data from the switch, i.e., an output 68 from the selector 664 is cell data output from the high-priority class buffer 6203.

The system of shifting the priority separately for the high- and low-priority classes by rotational scheduling (round robin scheduling) will be described in detail.

For example, if the high-priority class cell buffer 6203 at the port 603 outputs a cell, the high-priority ring state value of the arbiter 653 which output the cell changes to logic "1". On the high-priority class side, the arbiter 653 acquires the lowest priority, and the subsequent arbiter 654 acquires the highest priority. The priority descends in an order of the arbiters 651 and 652.

On the low-priority class side, no port outputs a cell (of low-priority class). In the next cell period as well as the previous cell period, the arbiter 651 has the highest priority. The priority descends in an order of the arbiters 652, 653, and 654.

Cell data output in the next period (second cell period) in FIG. 6 is cell data stored in the high-priority class cell buffer 6204. Cell data stored in the low-priority class cell buffers 6211 to 6214 are not output until all high-priority class cell data are output.

What is claimed is:

1. A contention priority control circuit comprising a plurality of arbiters and which receives data of two priority classes from a plurality of input ports, and arbitrates contention between output requests for outputting the plurality of data to a bus on the basis of the priority classes and priorities determined for the respective input ports, priorities of said plurality of arbiters being determined by round robin scheduling for each of the two priority classes, and contention between data output requests is arbitrated based on the priorities of said arbiters.

2. A circuit according to claim 1, wherein the priorities determined for the respective input ports are changeable for each of the two priority classes.

3. A circuit according to claim 1, wherein said contention priority control circuit is a ring arbiter constituted by connecting arbiters on a ring.

4. A circuit according to claim 2, wherein said contention priority control circuit is a ring arbiter constituted by connecting arbiters on a ring.

5. A contention priority control circuit comprising a plurality of arbiters which are arranged at a plurality of input ports for receiving data of two priority classes, and receive data output requests for each of the two priority classes, a forward light-priority ring for connecting said plurality of arbiters in a forward direction, a forward low-priority ring for connecting said plurality of arbiters in the forward direction, and a backward high-priority ring for connecting said plurality of arbiters in a backward direction opposite to the forward direction, wherein said forward high-priority ring transmits presence/absence of a high-priority output request to each arbiter in the forward direction, said forward low-priority ring transmits presence/absence of a low-priority output request to each arbiter in the forward direction, and said backward high-priority ring transmits presence/absence of a high-priority output request to each arbiter in the backward direction, thereby arbitrating contention between data output requests.

6. A contention priority control circuit in the form of a ring arbiter constituted by connecting arbiters in a ring and which receives data of two priority classes from a plurality of input ports, and arbitrates contention between output requests for outputting the plurality of data to a bus on the basis of the priority classes and priorities determined for the respective input ports, wherein the priorities determined for the respective input ports are changeable for each of the two priority classes, wherein priorities of said plurality of arbiters are determined by round robin scheduling for each of the two priority classes, and contention between data output requests is arbitrated based on the priorities of said arbiters.

7. A circuit according to claim 1 in combination with an ATM switchboard using the contention priority control circuit.

8. A circuit according to claim 2 in combination with an ATM switchboard using the contention priority control circuit.

9. A circuit according to claim 3 in combination with an ATM switchboard using the contention priority control circuit.

10. A circuit according to claim 4 in combination with an ATM switchboard using the contention priority control circuit.

11. A circuit according to claim 5 in combination with an ATM switchboard using the contention priority control circuit.

12. A circuit according to claim 6 in combination with an ATM switchboard using the contention priority control circuit.

* * * * *